United States Patent [19]

Suzuki

[11] 4,290,743

[45] Sep. 22, 1981

[54] DIE FOR EXTRUDING A HONEYCOMB STRUCTURAL BODY AND A METHOD FOR MANUFACTURING THE SAME

[75] Inventor: Kazuo Suzuki, Inazawa, Japan

[73] Assignee: NGK Insulators, Ltd., Nagoya, Japan

[21] Appl. No.: 132,626

[22] Filed: Mar. 21, 1980

[30] Foreign Application Priority Data

Nov. 20, 1979 [JP] Japan ................................ 54/149439

[51] Int. Cl.[3] ................................................ B29F 3/00

[52] U.S. Cl. ...................................... 425/461; 29/558; 29/DIG. 26; 264/177 R; 264/209.1; 264/209.8; 425/464; 425/467

[58] Field of Search ............... 425/461, 464, 198, 197, 425/467; 264/177 R, 56, 63, 209.1, 209.8; 29/DIG. 26, 558

[56] References Cited

U.S. PATENT DOCUMENTS

| | | | |
|---|---|---|---|
| 3,824,196 | 7/1974 | Benbow et al. | 425/461 |
| 3,846,197 | 11/1974 | Wiley | 425/464 |
| 3,905,743 | 9/1975 | Bagley | 425/464 |
| 4,041,597 | 8/1977 | Folmar et al. | 425/464 |
| 4,118,456 | 10/1978 | Blanding et al. | 425/464 |
| 4,163,640 | 8/1979 | Higuchi et al. | 425/466 |
| 4,168,944 | 9/1979 | Morikawa et al. | 425/464 |
| 4,259,057 | 3/1981 | Abe et al. | 425/463 |

FOREIGN PATENT DOCUMENTS 50-20435 6/1976 Japan .

*Primary Examiner*—Jeffery R. Thurlow
*Attorney, Agent, or Firm*—Stevens, Davis, Miller & Mosher

[57] ABSTRACT

A die for extruding a honeycomb structural body for a catalyst support, which catalyst removes harmful gases in exhaust gas, composing of an integral metal block provided with (a) one surface provided with a plurality of circular perforated holes A having a given depth and a given pattern and a grid-formed slits conforming to a cross-sectional shape of a honeycomb structural body to be extruded and (b) another surface provided with a plurality of perforated holes B having a given depth and a given pattern, said slits connecting to the holes B, having a smaller width than a diameter of the holes A and passing through center of the holes A. Said die is manufactured by providing the slits after perforating the holes A.

16 Claims, 6 Drawing Figures

DIE FOR EXTRUDING A HONEYCOMB STRUCTURAL BODY AND A METHOD FOR MANUFACTURING THE SAME

The present invention relates to a die for extruding a honeycomb structural body and a method for manufacturing the same.

A honeycomb structural body composed of, for example, ceramic and having an open frontal area of 60–90%, preferably 65–85%, wherein numerous parallel cells are extended in the axial direction and formed by comparatively thin grid-formed partitions in order to deposit platinum catalyst for removing harmful carbon monoxide (CO), hydrocarbons (HC), nitrogen oxides (NOx) and the like, is produced by extruding a raw material composed of a ceramic material through a die into a ceramic green shaped article by extrusion forming and drying and firing the shaped article as known from the method for manufacturing a honeycomb structural body described in, for example, U.S. Pat. No. 3,824,196 to Benbow et al.

The thus formed ceramic honeycomb structural body is low in the activity of the partition wall surface, so that it is difficult to deposit platinum catalyst directly and therefore, $\gamma$-alumina having a high activity is previously coated thereon and then the thus coated honeycomb structural body is dipped in platinum catalyst solution to penetrate platinum catalyst into $\gamma$-alumina, whereby $\gamma$-alumina and the carried platinum catalyst are deposited on the partition wall surface of the honeycomb structural body as shown in FIG. 1.

However, the viscosity of $\gamma$-alumina is relatively high, so that when coating, $\gamma$-alumina deposited on the surface of the partition wall 1 is more thick at corner portions 3 of the partition wall intersections as shown in FIG. 1. The platinum catalyst solution deposited thereafter is relatively low in the viscosity and penetrates over the entire region of the $\gamma$-alumina layer, so that the platinum catalyst is deposited more thickly at the corner portions 3 than at the wall portions 2. Exhaust gas penetrates only to a given depth from the surface of the platinum catalyst layer, so that the platinum catalyst at the corner portion 3 is not fully used and comes to nothing. In order to save the platinum catalyst consisting mainly of platinum which is expensive and exhausted as resource, it is desirable that the corner portions of the honeycomb structural body where the partition walls are crossed or intersected, do not form right angle but form round and that $\gamma$-alumina does not deposit on the corner portions in a higher thickness.

It can be attained by previously forming the slit crossing or intersecting portions of the extrusion die round that the partition wall crossing or intersecting portions of the honeycomb structural body are made to be round. In general, in the die for extruding the honeycomb structural body, a large number of holes for supplying the material to be extruded are perforated at one surface of an integral metal block and at another surface of said block are cut relatively narrow grid-formed slits having a depth connecting to said large number of holes, intersections of the slits are matched to the holes.

It has been known from Japanese Published Examined Patent Application No. 20,435/76 that the corners of the slit crossing or intersecting portions of the thus manufactured die are removed by cutting or electric discharge machining to form expanded portions at the crossing or intersecting portions but it is very difficult to insert a cutting tool for removing the corners of the crossing or intersecting portions of the die slit or to precisely manufacture an electric discharge machining electrode having a small round shape, and hereafter considering that the die in which the slit width is narrow and the pitch between slits is narrow, is required, the cost for manufacturing such a die becomes very high and such means is not commercially valuable.

The present invention has been made to obviate the above described problems and is to provide a die in which the slits are cut after the holes for extruding the raw material have been perforated and methods for manufacturing said die. The present invention consists in a die for extruding a honeycomb structural body including an integral metal block having one surface provided with a plurality of circular holes A perforated in a given depth and a given pattern and a grid-formed slits conforming to the cross-sectional shape of the honeycomb structural body to be extruded, and another surface provided with a plurality of holes B perforated in a given depth and a given pattern, said slits connecting to the holes B and having a smaller width than the diameter of the holes A and passing through the center of the holes A, and a method for manufacturing the die for extruding the honeycomb structural body which comprises perforating a plurality of circular holes A having a given depth and a given pattern on one surface of an integral metal block, perforating a plurality of holes B having a given depth and a given pattern on another surface of said block and providing slits connecting to said holes B and having a grid-form conforming to the cross-sectional shape of a honeycomb structural body to be extruded at the surface provided with the holes A, said slits having a smaller width than a diameter of the holes A and passing through the center of said holes A when the slits pass through the holes A.

The present invention will be explained in more detail with reference to examples shown in the drawings.

For a better understanding of the invention, reference is taken to the accompanying drawings, wherein.

Figure 1:
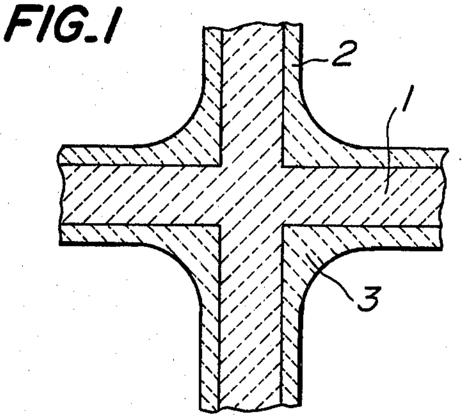
FIG. 1 is an enlarged cross-sectional view of an essential part of a honeycomb structural body manufactured by means of a conventional die, and coated with $\gamma$-alumina layer.
Figure 2:
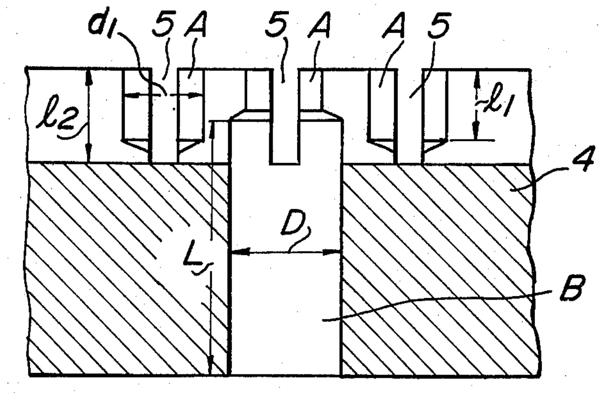
FIG. 2 is a cross-sectional view taken along line II—II in FIG. 3.

As shown in FIG. 2, a cross-sectional view of an essential part of a die manufactured according to the present invention, a plurality of circular holes A are perforated at one surface of the die base metal 4 in a given depth and a given pattern. At another surface are perforated holes B for supplying the raw material in the arrangement that these holes oppose to and align with alternate holes A (FIGS. 2 and 3) or to all holes A (not shown). Then, grid-formed slits 5 conforming to the cross-sectional shape of the honeycomb structural body to be extruded are cut by electric discharge machining, grinding by means of grinding wheel, milling and the like to a depth connecting to the holes B and passing through the center of the holes A. The working order may be the perforation of the holes A, the cutting of the slits and the perforation of the holes B or the perforation of the holes B, the perforation of the holes A and the cutting of the slits instead of the order of the perforation of the holes A, the perforation of the holes B and the cutting of the slits. In any case, prior to the cutting of the slits 5, the holes A must be perforated.

Figure 3:
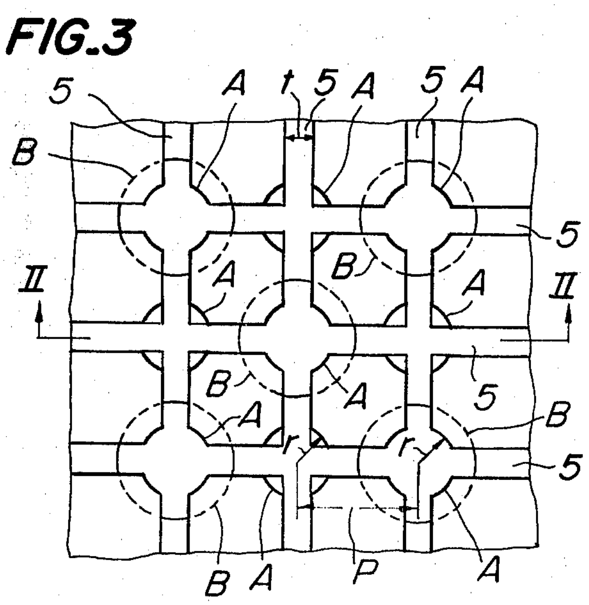
FIG. 3 is a plan view of an essential part of a die manufactured according to the present invention.

In the thus manufactured die, as shown in FIG. 3 the slit crossing or intersecting portions have a round or a swelled-arc shape, the curvature of which is a radius r of the hole A. The honeycomb structural body produced by setting this die at an extruder (not shown) and extruding a raw material through such an extruder has the round, the curvature of which is the radius of the hole A, at the corner portions where the partition walls are crossed or intersected.

The holes A are arranged so that the center of the hole A positions at the slit intersection but the holes B for supplying the raw material may be arranged so that these holes B do not oppose to all the slit intersections but oppose to and align with the alternate slit intersections as shown in FIG. 3. In this case, the hole A not opposing to the hole B for supplying the raw material during extrusion forming is less in the abrasion of the die at the round portion than the hole A opposing to the hole B. Accordingly, when the extrusion forming is carried out for a long period of time, the curvature of this round portion varies, so that it is desirable that the curvature of the holes A opposing to and aligning with the holes B is smaller than that of the holes A not opposing to the holes B. And, when all the holes B oppose to and align with the slit intersection, of course, all the curvature of the holes A may be equal.

The raw material continuously fed to the slits from the holes B spreads in the slits and is extruded along the round portion of the corner at the slit crossing or intersecting portion and the corner portions where the partition walls of the extruded honeycomb structural body are crossed or intersected, become round.

When a depth $l_1$ at the round portion provided at the slit crossing or intersecting portion is extremely small, it is impossible to provide the round to the extruded honeycomb structural body round and it is desirable to make the depth $l_1$ to be more than $\frac{2}{3}$ of the slit depth $l_2$.

The functional merit of the present invention based on the above described construction will be explained hereinafter. The holes A can be perforated by the usual drilling, so that the equal holes to the diameter of the drill can be precisely perforated and the position of the holes A can be exactly located prior to cutting of the slits. That is, when the holes A are perforated after cutting the slits, it is impossible to mark-off the centers of the holes and to locate the position by means of a center punch and it is infeasible to precisely locate the position but the present invention has solved these problems.

Round working can be very easily carried out without needing very fine cutting tool (broach blade) and electric discharge machining electrode as in the prior technic in order to remove the corners of the slit intersection after cutting the slits. In addition, the holes A perforating the base metal have been formed prior to cutting the slits, so that the working for forming slits can be more precisely carried out than the prior technic.

Figure 4:
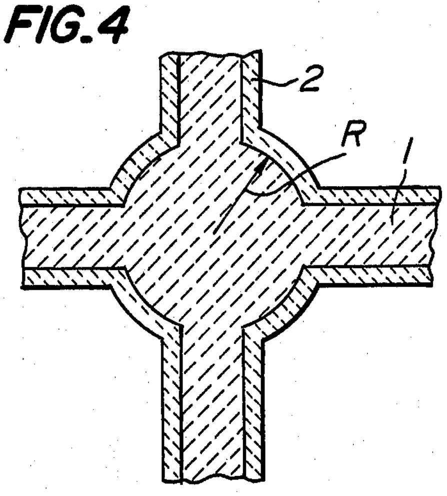
FIG. 4 is an enlarged cross-sectional view of an essential part of a honeycomb structural body produced by using a die manufactured according to the present invention, and coated with $\gamma$-alumina layer.

When the extrusion forming is carried out for a long period of time, the slit crossing or intersecting portions of the holes A opposing to and aligning with the holes B for supplying the raw material are more rapidly worn than those not opposing to the holes B, so that the diameter of the holes A opposing to the holes B has been made to be smaller in size than that of the holes A not opposing to the holes B by expecting that the abrasion of the former holes A is higher than that of the latter holes A and therefore the honeycomb structural bodies wherein the variation of the curvature radius R of the partition wall crossing or intersecting portions shown in FIG. 4 is small, can be advantageously obtained for a long period of time.

Furthermore, by making the depth $l_1$ of the holes A to be more than $\frac{2}{3}$ of the depth $l_2$ of the slits, it is possible to provide the same form of round as in the slit crossing or intersecting portions of the die to the corner portions of the extruded honeycomb structural body.

Figure 5:
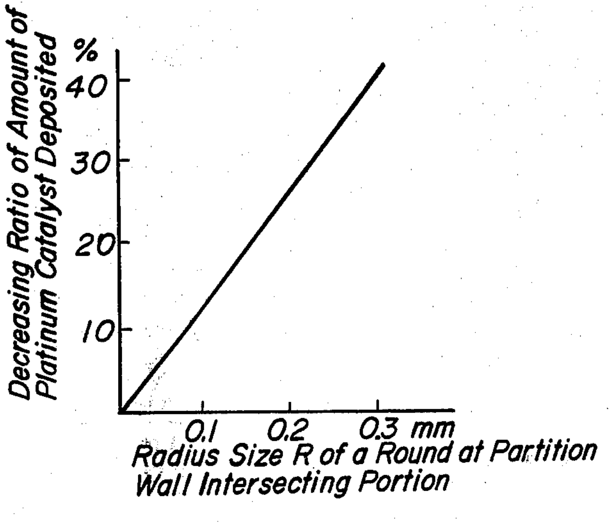
FIG. 5 is a graph showing the relation of radius size of the round at a corner portion where partition walls are crossed, in a honeycomb structural body produced by means of the die manufactured according to the present invention to the decreasing ratio of an amount of platinum catalyst deposited.

By using the thus manufactured die, a ceramic honeycomb structural body is formed and the formed body is dried and fired to obtain a product as shown in FIG. 4. When the thus formed honeycomb structural body is coated with $\gamma$-alumina and then deposited uniform in thickness with platinum catalyst, the platinum catalyst deposited on the corner portions of the honeycomb structural body where the partition walls are crossed or intersected is completely used. As shown in FIG. 5, the decreasing ratio of the amount of platinum catalyst deposited when the curvature radius R at the corner portion of the honeycomb structural body where the partition walls are crossed or intersected, is 0.3 mm, is about 40% as compared with that of the conventional curvature radius R of 0 mm and said ratio when the curvature radius is 0.2 mm, is about 26%. In addition, the cost for manufacturing the die is low. Accordingly, the present invention is very high in the commercial value.

In order to adjust the curvature radius size finely, use may be made of a die manufactured by subjecting all surfaces including the inner surface of the slits of the die manufactured as mentioned above to electroless nickel plating and heating the coated die to improve the cohesion of the base metal and the plating layer and the abrasion resistance.

Namely, the thickness of the electroless nickel plated layer can be finely controlled by the plating time and the curvature radius of the round can be adjusted by the thickness of the plated layer, so that the die having the necessary curvature radius can be easily manufactured.

The following examples are given for the purpose of illustration of this invention and are not intended as limitations thereof.

EXAMPLE 1

Figure 6:
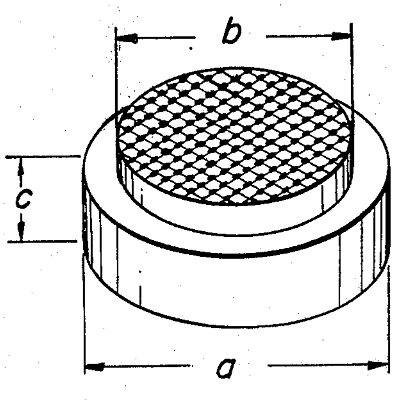
FIG. 6 is a perspective view of the die shown in Example of the present invention.

On one surface of a base steel block worked in such a size that a diameter a is 215 mm, a diameter b of slit working portion is 160 mm and a thickness c is 26.5 mm as shown in FIG. 6, was effected marking-off in a grid-form wherein a pitch between holes is 1.35 mm to locate the position of center of the holes A and the holes having a diameter $d_1$ of 0.6 mm and a depth $l_1$ of 1.7 mm were perforated as shown in FIG. 3.

On another surface of the base steel block were perforated holes B for supplying a raw material having a diameter D of 1.5 mm and a depth L of 25 mm at position opposing to alternate holes A.

Then, as shown in FIG. 3, grid-formed slits having a width t of 0.18 mm and a depth $l_2$ of 2.5 mm, that is deeper than that of the slits of the conventional die because the powdered chips of electric discharge machining can be removed easily through the holes A, were cut by electric discharge machining in the position that the slits pass through the center of the holes A to obtain the desired die.

The thus manufactured die was set on an extruder (not shown) and a ceramic raw material was extruded through the extruder to obtain a honeycomb structural body having a thickness of partition wall of 0.157 mm, a pitch between the partition walls of 1.25 mm, an outer diameter of 148 mm and a length of 83 mm. The thus formed honeycomb structural body was dried and fired and then coated with γ-alumina, after which platinum catalyst was deposited thereon. It has been found that the decreasing ratio of amount of platinum catalyst deposited of the thus obtained honeycomb structural body is 40% as compared with the conventional honeycomb structural body wherein the corner portion where the partition walls are crossed or intersected, is right angle, and that the efficiency for purifying the exhaust gas is not inferior to the conventional honeycomb structural body.

EXAMPLE 2

On one surface of a base steel block worked in such a size that a diameter a is 215 mm, a diameter b of slit working portion is 160 mm and a thickness c is 26.5 mm, was effected marking-off in a grid-form wherein a pitch P between holes is 1.35 mm to locate the position of center of the holes A and the holes having a diameter $d_1$ to 0.7 mm and a depth $l_1$ of 1.7 mm were perforated as shown in FIG. 3. On another surface of the base steel block were perforated holes B for supplying a raw material having a diameter D of 1.5 mm and a depth L of 25 mm at position opposing to alternate holes A.

Then, grid-formed slits having a width t of 0.28 mm and a length $l_2$ of 2.5 mm were cut by electric discharge machining in such a position that the slits pass through the center of the holes.

The thus manufactured die was subjected to electroless nickel plating to provide nickel plated layer having a thickness of 0.05 mm on the inner surfaces of the slits of the die and then heat-treated at 400° C. to improve the cohesion of the plated layer and the base metal and the abrasion resistance of the plated layer.

The curvature radius r of the round at the corner portion where the slits are crossed or intersected was 0.3 mm and the thickness of the plated layer can be freely controlled by the time dipping the die in the electroless nickel plating bath. When the thickness of the plated layer is 0.07 mm, r becomes 0.28 mm. After using the die for extrusion, the die was dipped in nitric acid solution to remove the plated layer and then again subjected to electroless nickel plating to a thickness of the plated layer of 0.04 mm, whereby r becames 0.31 mm and thus r size in the same base metal die can be freely varied. Thus, by reusing the die in this manner, it is possible to manufacture the die by which the honeycomb structural body corresponding to the aimed decreasing ratio of amount of platinum catalyst deposited can be produced.

What is claimed is:

1. A die for extruding a honeycomb structural body composing of an integral metal block provided with (a) one surface provided with a plurality of circular perforated holes A having a given depth and a given pattern and a grid-formed slits conforming to a cross-sectional shape of a extruded honeycomb structural body to be extruded and (b) another surface provided with a plurality of perforated holes B having a given depth and a given pattern, said slits connecting to the holes B, having a smaller width than a diameter of the holes A and passing through center of the holes A.

2. A die as claimed in claim 1, wherein the diameter of the holes A is smaller than the diameter of the holes B.

3. A die as claimed in claim 1 or 2, wherein the depth of the holes A is more than $\frac{2}{3}$ of the depth of the slits.

4. A die as claimed in claim 3, wherein the slits pass through center of the holes A at all the points where the slits are intersected.

5. A die as claimed in claim 4, wherein the holes B align with the holes A and are perforated at alternate portion where the above described slits are intersected.

6. A die as claimed in claim 5, wherein the diameter of the holes A aligning with the holes B is smaller than the diameter of the holes A not aligning with the holes B.

7. A method for manufacturing a die for extruding a honeycomb structural body, which comprises (a) perforating a plurality of circular holes A having a given depth and a given pattern on one surface of an integral metal block, (b) perforating a plurality of holes B having a given depth and a given pattern on another surface of said block and (c) providing a grid-formed slits conforming to a cross-sectional shape of a honeycomb structural body to be extruded and connecting to the holes B on the surface provided with the holes A, said slits having a smaller width than a diameter of the holes A and the slits which pass through the holes A, passing through center of the holes A.

8. A method as claimed in claim 7, wherein the diameter of the holes A is smaller than the diameter of the holes B.

9. A method as claimed in claim 7 or 8, wherein the depth of the holes A is more than $\frac{2}{3}$ of the depth of the slits.

10. A method as claimed in claim 9, wherein the slits pass through the center of the holes at all the points where the slits are intersected.

11. A die as claimed in claim 10, wherein the holes B align with the holes A and are perforated at alternate portion where the above described slits are crossed.

12. A die as claimed in claim 11, wherein the diameter of the holes A aligning with the holes B is smaller than the diameter of the holes A not aligning with the holes B.

13. A method for manufacturing a die for extruding a honeycomb structural body, which comprises (a′) perforating a plurality of circular holes A having a given depth and a given pattern on one surface of an integral metal block, (b′) providing a grid-formed slits conforming to a cross-sectional shape of a honeycomb structural body to be extruded on the block surface provided with the holes A, (c') perforating a plurality of holes B having a given depth and a given pattern and connecting to the slits on another surface of said block and said slits having a smaller width than a diameter of the holes A and the slits which pass through the holes A, passing through the center of the holes A, 14. A method for manufacturing a die for extruding a honeycomb structural body, which comprises (a'') perforating a plurality of holes B having a given depth and a given pattern on one surface of an integral metal block, (b'') perforating a plurality of circular holes A having a given depth and a given pattern on another surface of said block, (c'') providing a grid-formed slits conforming to a cross-sectional shape of a honeycomb structural body to be extruded and connecting to the holes B on the surface provided with the holes A, said slits having a smaller width than the diameter of the holes A and the slits which pass through the holes A, passing through center of the holes A.

15. A die for extruding a honeycomb structural body comprised of an integral metal block having first and second opposing surfaces, said first opposing surface being provided with a plurality of first circular perforated holes and with a grid of slits conforming to the cross-sectional shape of the honeycomb structural body to be extruded from said die, said grid-formed slits being superimposed upon said first circular perforated holes such that each intersection of said grid is centered within one of said first circular perforated holes; said second opposing surface being provided with a plurality of second perforated holes, the number and placement of said second perforated holes being such that alternate first perforated holes are connected with said second perforated holes, said second perforated holes having a larger diameter than said first circular perforated holes, said slits having a smaller width than the diameter of said first circular perforated holes.

16. A method for manufacturing a die for extruding a honeycomb structural body comprising (a) perforating a first opposing surface of an integral metal block having first and second opposing surfaces with a plurality of first circular holes;

(b) superimposing a grid of slits conforming to the cross-sectional shape of the honeycomb structural body to be extruded from said die upon said first circular perforated holes, said slits having a smaller width than the diameter of said first circular perforated holes, said superimposition being such that each intersection of said grid is centered within one of said first circular perforated holes;

(c) perforating said second opposing surface with a plurality of second perforated holes, the number and placement of said second perforated holes being such that alternate first perforated holes are connected with said second perforated holes, said second perforated holes having a larger diameter than said first circular perforated holes.

* * * * *